United States Patent
Kaminski et al.

(10) Patent No.: US 12,215,696 B2
(45) Date of Patent: Feb. 4, 2025

(54) PUMP WITH VIBRATION SENSOR AND ITS PRODUCTION PROCESS

(71) Applicant: KSB SAS, Gennevilliers (FR)

(72) Inventors: Mateusz Kaminski, Loos (FR); Hugues Roland, Méteren (FR)

(73) Assignee: KSB SAS, Gennevilliers (FR)

( * ) Notice: Subject to any disclaimer, the term of this patent is extended or adjusted under 35 U.S.C. 154(b) by 18 days.

(21) Appl. No.: 18/061,575

(22) Filed: Dec. 5, 2022

(65) Prior Publication Data

US 2023/0243358 A1 Aug. 3, 2023

(30) Foreign Application Priority Data

Feb. 1, 2022 (FR) .................................. 2200894

(51) Int. Cl.
*F04D 15/00* (2006.01)
*E03C 1/122* (2006.01)
*F04D 13/06* (2006.01)
*G01H 1/00* (2006.01)

(52) U.S. Cl.
CPC ........ *F04D 15/0088* (2013.01); *E03C 1/1227* (2013.01); *F04D 13/06* (2013.01); *G01H 1/006* (2013.01)

(58) Field of Classification Search
CPC .... F04D 15/0088; F04D 13/06; F04D 13/086; F04D 15/0066; F04D 29/2244; F04D 29/669; F04D 7/04; F04D 15/00; F04D 13/0606; E03C 1/1227; G01H 1/006; H04Q 9/00; H04Q 2209/30; H02K 3/44; H02K 5/00; G01M 15/12
See application file for complete search history.

(56) References Cited

U.S. PATENT DOCUMENTS

| | | | | |
|---|---|---|---|---|
| 4,520,674 A * | 6/1985 | Canada | ............. | G01H 1/00 702/56 |
| 4,885,707 A * | 12/1989 | Nichol | ............. | G01H 1/003 702/56 |
| 5,602,757 A * | 2/1997 | Haseley | ............. | F04C 28/28 702/56 |
| 5,610,339 A * | 3/1997 | Haseley | ............. | G01H 1/003 702/56 |
| 6,053,047 A * | 4/2000 | Dister | ............. | G01M 13/028 73/660 |
| 6,260,004 B1 * | 7/2001 | Hays | ............. | F04D 15/0088 702/183 |
| 6,289,735 B1 * | 9/2001 | Dister | ............. | G01H 1/003 73/659 |
| 6,435,836 B1 * | 8/2002 | Kobayashi | ............. | F04D 15/0263 417/32 |

(Continued)

FOREIGN PATENT DOCUMENTS

EP 3546760 10/2019
WO 2006127939 11/2006

*Primary Examiner* — Charles G Freay
*Assistant Examiner* — Benjamin Doyle
(74) *Attorney, Agent, or Firm* — Renner, Kenner, Greive, Bobak, Taylor & Weber

(57) ABSTRACT

This pump includes a computing device, with a vibration waveform analysis section and a memory, the analysis section being designed to control the motor, by comparing a vibration waveform received from the vibration sensor with vibration waveforms saved in the memory.

5 Claims, 1 Drawing Sheet

(56) References Cited

U.S. PATENT DOCUMENTS

Figure 1:
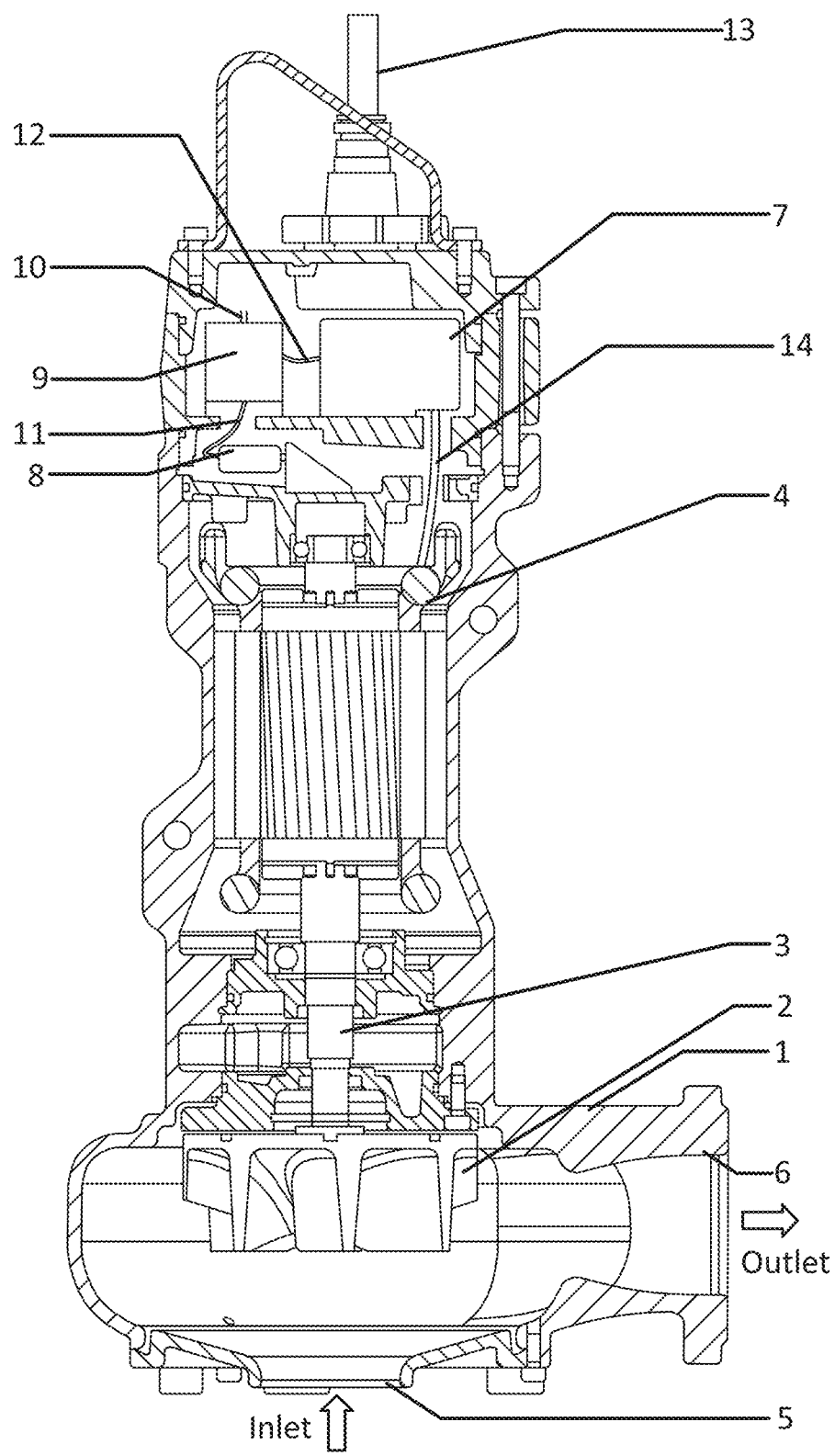

| | | | |
|---|---|---|---|
| 2004/0236494 A1* | 11/2004 | DeBotton | G01M 15/12 |
| | | | 701/111 |
| 2006/0266913 A1* | 11/2006 | McCoy | F04D 15/0088 |
| | | | 248/550 |
| 2011/0051297 A1* | 3/2011 | Knox | E21B 47/008 |
| | | | 361/23 |
| 2011/0301872 A1* | 12/2011 | Hedin | G01M 13/028 |
| | | | 702/34 |
| 2014/0086765 A1 | 3/2014 | Atherton | |
| 2019/0174207 A1* | 6/2019 | Cella | H04L 67/12 |
| 2020/0049152 A1 | 2/2020 | Gu et al. | |
| 2020/0362867 A1* | 11/2020 | Fox | F04D 15/0066 |

* cited by examiner

PUMP WITH VIBRATION SENSOR AND ITS PRODUCTION PROCESS

The present invention relates to pumps, in particular wastewater pumps.

Wastewater often contains wet wipes or tissues which cause blockages. A pump should not become clogged and require manual intervention to maintain it in optimum working condition.

EP3546760 describes a system that transmits vibration levels to the user. It is not a self-contained pump but simply a check. The pump does not work by itself.

The invention concerns a pump, fitted with means for detecting a danger of malfunction of the pump at an early stage and itself taking adequate measures to prevent this.

The pump according to the invention comprises a body, enclosing by a removable cover:
- An impeller attached to a rotating shaft driven by an electric motor and enclosed within a casing with an inlet orifice and an outlet tube between which lies the impeller,
- A variable frequency motor controller,
- An accelerometer type vibration sensor, mounted on a non-rotating part of the pump that detects vibration waveforms,
- A computing device connected by cable firstly to the vibration sensor and secondly to the frequency converter in order to analyse vibration waveforms and transmit a control signal for the motor to the frequency converter that conforms to the vibration waveform received from the vibration sensor, characterised in that the computing device has a memory and a communication terminal providing, when the cover is removed, communication with an external information device used initially to load the memory by sending messages from the external device to the computing device, the communication from the communication terminal with the external device being interrupted when the cover is replaced while the pump is in operation.

The computing device comprises a section for analysis of vibration waveforms and a memory to store vibration waveforms, the analysis section being designed so that by comparing a vibration waveform received instantaneously from the vibration sensor with vibration waveforms already stored in the memory it sends a motor control signal to the frequency converter that is identical to that previously sent for the vibration waveform received from the vibration sensor in the vibration waveform analysis section which most resembles the instantaneous waveform received from the vibration sensor.

One signal may correspond to a pump stop signal and another signal may correspond to a normal operation signal, yet another signal may correspond to a signal for reversal of the direction of impeller rotation for a given period, corresponding to cleaning the pump. Another signal may correspond to a signal to reduce the speed of rotation of the impeller and another signal may correspond to a signal to increase its speed.

When a wet wipe passes through the pump during normal operation, the accelerometer sends to the computing data storage device an instantaneous vibration waveform analysed by the analysis section of the computing device. If by comparison it is identical to a vibration waveform already in the memory, the computing device immediately sends to the control device an electrical control signal for the motor assigned to this vibration waveform already in the memory. If the instantaneous vibration waveform received from the accelerometer does not correspond exactly to a vibration waveform already stored in the memory, the analysis section of the computing device compares it with the vibration waveforms already in the memory and sends the electrical control signal to the motor control device corresponding to the signal associated with the vibration waveform that most resembles the instantaneous vibration waveform received from the vibration sensor. The motor control device receives the control signal for the motor with no delay without having to determine the load factor of the electric motor, which takes time, as proposed in WO 2013/096726.

Where appropriate, if the vibration waveform received from the vibration sensor is identical to a vibration waveform already stored in the memory, the analysis section sends the motor control signal to the motor control device but does not save this vibration waveform in memory. According to this variant, the analysis section does not process the vibration waveform immediately following a vibration waveform when the two waveforms are identical, in order not to waste memory space. This applies especially to a waveform to which a signal corresponding to normal operation of the pump has been assigned.

The communication terminal is used initially to inform the memory by sending messages, for example time and date stamped data, from the external device to the computing device.

A vibration waveform represents a vibration variation, or variation curve, as a function of time for a previously defined period. This period may be between 10 ms and 500 ms, preferably between 20 ms and 250 ms and ideally between 30 and 200 ms.

The vibration amplitude may be used to characterise a vibration waveform. The analysis section can convert a vibration waveform into a clean signal for processing or analysis, for example by effective value (RMS), kurtosis, variance and for conversion to a set of data.

According to one method of implementation, the computing device is in the form of a card that is easy to replace or added to.

The invention also concerns a production process for a pump by building its computing device which includes a pump comprising a body and enclosing within a removable cover;
- An impeller rotated by a shaft driven by an electric motor surrounded by a casing with an inlet orifice and a flow tube between which lies the impeller,
- A motor control device with a frequency converter,
- An accelerometer type vibration sensor, fitted to a non-rotating part of the pump and generating a vibration waveform, characterised in that the pump is fitted with a pristine computing device with a terminal for communicating, only when the cover is removed, with an external device and connected firstly by cable to the vibration sensor and secondly to the frequency converter, in such a way as to analyse vibration waveforms and send a control signal for the motor to the frequency converter as a function of the vibration waveform received from the vibration sensor. The pump is started while the cover is removed and the computing device is communicating with the external device, according to a first method of operation, from a given moment, for a first given period, the subsequent vibration waveforms are transmitted immediately from this moment by the communication terminal of the external device to the computing device, at the same time instructing it to save them to memory assigning to them a first control signal for the motor corresponding to the first mode of operation. After the first period elapsed, the pump then is started at a second moment, different from the first moment, for a period equal to the first period, while the cover is removed and the computing device is communicating with the external device, according to a second mode of operation, different from the first mode of operation. Immediately after the second moment, subsequent vibration waveforms are transmitted by the communication terminal from the external device to the computing device, instructing it to save them to memory assigning to them a second motor control signal, different from the first signal, corresponding to the second mode of operation. The cover is then replaced on the body, thereby preventing any communication from the external device to the computing device.

These production operations, by operation, transmission and saving to memory, are repeated until at least one vibration waveform corresponding to each envisaged mode of operation respectively, has been saved to memory.

By carrying out these operations in the factory once and for all for the pump, a pump according to the invention is produced which, in operation, will work autonomously by analysing itself, by means of the vibrations it produces, the events or operations that it faces and immediately making the decisions imposed on it while learning.

In the attached drawing, given only as an example, the single diagram is a cross-sectional view of a pump according to the invention which, in operation, works autonomously by analysing the events or modes of operation that it faces and by making the correct decisions while learning.

The pump shown in the diagram comprises, enclosed by a cover, a body with a casing 1 having an inlet orifice 5 and a wastewater outlet tube 6, as symbolised by the arrows. The casing encloses an impeller 2 attached to a rotating shaft 3 driven by an electric motor 4, which is itself connected to a frequency converter 7. An accelerometer 8 is mounted at the top of the pump forming a compartment for the motor control device and is connected to a computing device 9 having a terminal 10 that communicates with an external device (not shown). The accelerometer is connected to the computing device by a cable 11. The frequency converter 7 is connected to the computing device by a cable 12. The motor 4 is supplied with electrical power by a power supply cable 13 via the frequency converter 7 and a cable 14.

In the factory, the cover is removed from the top giving access to the data terminal 10 and the memory of the computing device 9 is preloaded in such a manner that, when the pump is started by the user, the computing device contains sufficient data in its memory, that is to say vibration waveforms, to enable it to compare them with the vibration waveform sent to it from the accelerometer 8. The pump is therefore intelligent and able to learn by itself.

What is claimed is:

1. A pump comprising a body enclosing within a removable cover:
    an impeller attached to a rotating shaft driven by an electric motor surrounded by a casing with an inlet orifice and an outlet tube between which lies the impeller,
    a motor control device with a frequency converter,
    an accelerometer type vibration sensor, mounted on a non-rotating part of the pump that produces vibration waveforms,
    a computing device connected by cable firstly to the vibration sensor and secondly to the frequency converter, in such a manner as to analyse the vibration waveforms and send a motor control signal for the motor to the frequency converter that is a function of the vibration waveform received from the vibration sensor, wherein the computing device has a memory, in which vibration waveforms are saved, and a communication terminal enabling it, when the cover is removed, to communicate with an external information device used to initialise the memory by sending messages from the external device to the computing device, communication from the communication terminal with the external device being interrupted when the cover is replaced while the pump is running, wherein the computing device has a vibration waveform analysis section and the memory also saves the vibration waveforms received, which were not already saved in the memory, the analysis section being designed so that, by comparing an instantaneous vibration waveform received from the vibration sensor, which was not already saved in the memory, with the vibration waveforms saved in the memory, it sends to the frequency converter a motor control signal identical to that sent previously for the vibration waveform saved in the memory, that most closely resembles the instantaneous vibration waveform received from the vibration sensor.

2. A pump according to claim 1, characterised in that the motor control signal may correspond to a pump stop signal, a normal operation signal, a signal for reversal of the direction of rotation of the impeller for a given period, a signal to reduce the speed of rotation of the impeller or a signal to increase the speed of rotation of the impeller.

3. A pump according to claim 1, characterised in that the computing device is in the form of a card.

4. A pump according to claim 1, characterised in that the body is subdivided into a compartment for the motor control device, a compartment for the motor and a compartment for the impeller and the computing device is housed in the compartment for the motor control device.

5. A pump according to claim 1, characterised in that it is a wastewater pump.

* * * * *